Feb. 4, 1958  M. G. WHITFIELD  2,822,218
INTEGRAL WHEEL AND DRUM
Filed July 6, 1953

Marshall G. Whitfield
INVENTOR

United States Patent Office 2,822,218
Patented Feb. 4, 1958

2,822,218

INTEGRAL WHEEL AND DRUM

Marshall G. Whitfield, Garden City, N. Y.

Application July 6, 1953, Serial No. 366,281

5 Claims. (Cl. 301—6)

This invention relates to vehicle wheels and more particularly to an automotive or aircraft wheel which is capable of carrying large torque loads and of quickly dissipating large amounts of heat.

Conventional aircraft or automotive wheels are usually constructed of aluminum or magnesium or strong alloys of these metals, such wheels are provided with frictional engaging surfaces for contacting a brake shoe. The frictional engaging surfaces are usually in the form of an iron or steel drum secured by bolts or rivets to the wheel. Under normal conditions such assembly of iron or steel drums and aluminum wheels have handled the normal dissipation of energy in the form of heat. However, such wheel assemblies when subjected to heavy loads, such as are encountered in aircraft using high speed take-off and landing conditions, the heavy drums and brakes are unduly cumbersome and often inadequate. During the life of a brake on an aircraft it may never be called upon to absorb high energies of a rejected-take-off or emergency landing, consequently the aircraft is penalized by the excess weight of the brake, braking unit, fluid chambers, brake valves, etc. Present day truck and bus manufacturers are also seeking a stronger and lighter brake wheel assembly.

It is an object of the present invention to provide a strong and light-weight vehicle wheel composed of aluminum, magnesium or a strong alloy of either said wheel having a thin ferrous metal brake liner integrally bonded thereto by either a complex molybdenum-iron-aluminum alloy or by a complex tin-iron-aluminum alloy.

Another object of this invention is to provide an aluminum automotive or aircraft wheel having a steel or cast iron braking liner integrally bonded with the aluminum wheel with the afore-mentioned complex alloy and in particular an aircraft wheel which is capable of repeatedly withstanding the heat and torque developed in rejected-take-off or emergency landing conditions.

Still another object of this invention is to provide an aluminum or aluminum alloy aircraft wheel having a main body portion provided with an outer rim extending at right-angles thereto and adapted to engage the rim of a rubber tire, and an inner steel or cast iron liner integrally bonded with underside of the rim by a complex tin-iron-aluminum alloy or a complex molybdenum-iron-aluminum alloy.

Yet another object of the invention is to provide an aircraft wheel composed of aluminum or aluminum alloy and a ferrous metal liner provided with ribs or similar extended surfaces which are intimately bonded with the aluminum or aluminum alloy rim portion by the afore-mentioned complex tin-iron-aluminum or complex molybdenum-iron-aluminum alloy.

Another object of the invention is to provide an aluminum or light metal vehicle or aircraft wheel having a segmented steel or cast iron liner integrally bonded by either of the afore-mentioned complex alloys to the underside of the rim portion of the wheel.

The above and other objects of the invention will be apparent upon reference to the following detailed description of my invention as shown in the accompanying drawings, in which.

Figure 1:
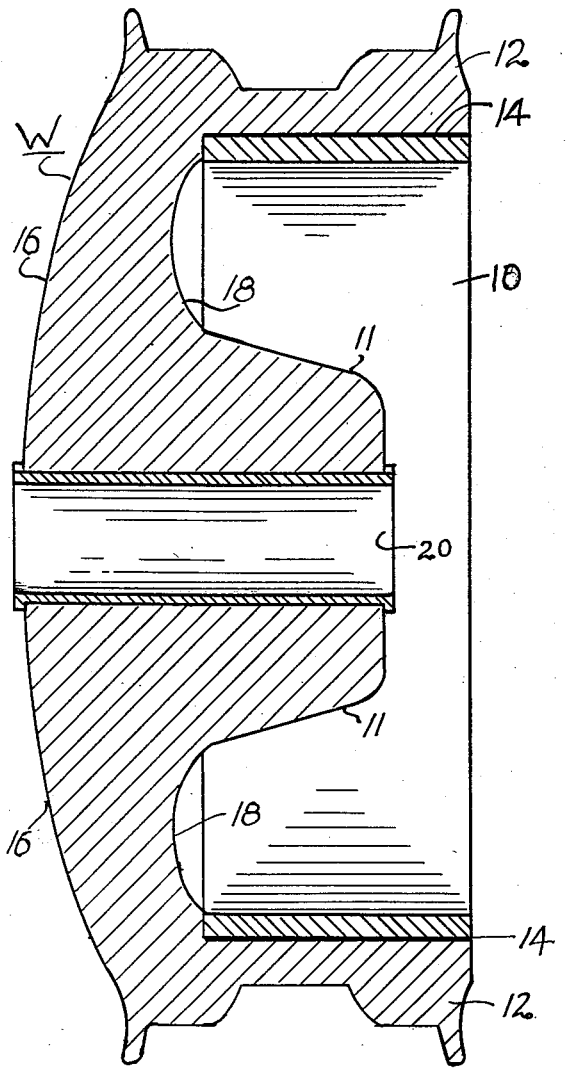
Fig. 1 is a side sectional view of an automotive or aircraft wheel embodying the principles of my invention.

With reference to the drawings, Fig. 1 shows an aluminum or aluminum alloy wheel W cast in one piece having a main body portion 11 and a rim portion 12. A steel or cast iron brake drum 10 is integrally bonded by a complex aluminum-iron-molybdenum alloy or by a complex aluminum-iron-tin alloy 14 to the underside of rim 12 of wheel W. These complex alloy bonds retain their strengths at elevated temperatures up to substantially the fusion temperature of iron. There is no substantial measurable temperature gradient across the bonding alloy and heat generated in the ferrous liner is rapidly dissipated into the main body portion 11 of the aluminum wheel W. Despite the inherent difference in the coefficients of expansion, separation of the liner from the wheel is prevented by the great strength of the complex intermetallic bond. As shown in Fig. 1 the main body portion 11 is provided with a curved outer surface 16 so as to approximate a streamlined effect. The inner surface 18 of the main body portion extends in a generally curved manner from the inside edge of the ferrous metal liner 10 to one edge of hub 20 which may be of conventional design. The annular ferrous metal liner 10 is thus conveniently located directly below the tire supporting rim 12 and absorbs torque directly from the tire. Due to the thinness of the steel or iron liner 10 it acts as an elastic part of the wheel and under heavy braking loads the ferrous liner may run somewhat out-of-round without serious effect.

Figure 2:
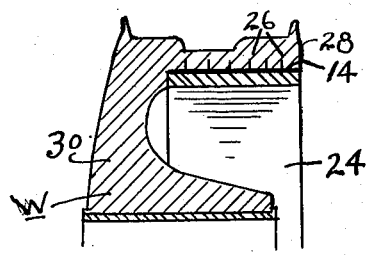
Fig. 2 is a partial sectional view of a modification of the wheel structure shown in Fig. 1.

Fig. 2 shows a partial sectional view of a modification of my invention in which the ferrous metal liner 24 is provided with a series of thin ferrous metal fins 26 projecting circumferentially out into the aluminum or aluminum alloy rim portion 28 of the aluminum wheel. These fins 26 assist in distributing both the torque and heat into the rim 28 and main body portion 30 of the wheel. Thin ferrous liners having fins or ridges of this nature have permitted rapid stops to be made without raising the temperature of the wheel above 500 degrees F. thus providing for a low rate of liner wear and preventing incipient fusion of the surface of the liner as is common in the use of an all-iron or centrifuge type of drum.

Figure 3:
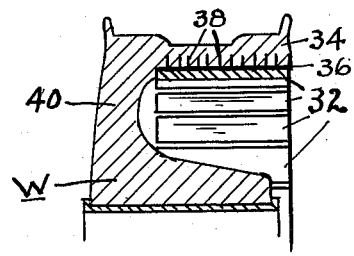
Fig. 3 is a partial sectional view of a further modification of the wheel structure shown in Fig. 1 employing a segmented braking liner.

Fig. 3 shows a partial sectional view of a further modification of my invention in which the ferrous metal brake liner is formed of a plurality of segmented sections 32 each of which is bonded to the aluminum rim 34 by the hereinbefore mentioned complex alloy 36 of aluminum-iron-molybdenum or aluminum-iron-tin. If desired, each segment may be provided with fins 38 to assist in distributing torque and heat to the body 40 of the wheel. The segmented liner construction, particularly with three or more segments will permit considerable out-of-round deformation to occur without serious damage to the wheel. Tests have shown that when the fins extend approximately 3/16 of an inch out from the liner into the aluminum, the structure remains intact after repeated conditions of great heat release.

For instance, a ferrous liner 15 inches in diameter consisting of six segments 0.160 inch thick, with 1/16 inch fins extending 3/16 inch from the outer surface of the liner and spaced ½ inch apart when bonded with a molybdenum-iron-aluminum bond to an aluminum wheel substantially of the construction shown in Fig. 3 successfully absorbed 10 million foot-pounds of kinetic energy over a period of 32 seconds without injury.

In conditions simulating a rejected take-off the cast iron or steel liner may reach a temperature between 2000 and 2200 degrees F. when measured 0.06 inch from the friction surfaces. However, the integral wheel and liner assembly of the present invention readily absorbs and quickly dissipates this heat without deleterious effect.

The integral wheel and brake liner assembly of the present invention is obtained by initially depositing a layer or coating of either molybdenum or tin on the external surface of the cast iron or steel liner. Preferably molybdenum is deposited by spraying the drum with molybdenum. The sprayed drum is then placed in a molten bath of aluminum and if necessary scoured to insure intimate wetting of the iron by the aluminum. A deposit of 0.5 to 6 thousandths of an inch in thickness is satisfactory. The molybdenum coated drum wetted with aluminum is placed in a mold and molten aluminum cast against it. The resulting complex bonding alloy of the molybdenum-aluminum-iron is very strong and highly heat conductive. Tin is preferably electrolytically plated onto the drum to a thickness between 2 to 5 thousandths of an inch. The plated drum may be processed in the same manner as indicated for the drum coated with molybdenum or it may be directly cast without the dipping step.

The complex aluminum-tin-iron bond or the complex aluminum-molybdenum-iron bond has a tensile strength and shearing strength superior to the conventional aluminum-iron alloy bonds used heretofore. For instance, aluminum wheels having ferrous metal liners bonded therein with the known iron-aluminum bond showed serious cracks after a kinetic energy stop of 4.6 million foot-pounds. Whereas similar aluminum wheels having ferrous metal liners bonded therein with a complex iron-molybdenum-aluminum alloy or the iron-aluminum-tin alloy did not fail or show any cracks after a kinetic energy stop of 10 million foot-pounds.

It is to be understood that the term "aluminum" or "light alloy" as used herein and in the claims denotes pure aluminum and any of its common casting alloys such as; Alcoa 143, 122, 132, 142, 195, 220, 335, 356, Frontier 40E, magnesium or Almag 35. The ferrous metal liner may be gray, malleable or austenitic irons, carbon alloy or stainless steel. If desired, the wheel and liner may be heat treated to improve physical properties and to stress-relieve the aluminum.

What is claimed is:

1. In a vehicle wheel a circular light-metal main-body portion, a light-metal flange portion circumferentially disposed about and integral with said circular main-body portion, a radially and outwardly extending edge on either side of and integral with the outer portion of said flange to define a pneumatic tire supporting rim, a relatively thin circular ferrous metal brake liner on the inner portion of said flange opposite to said rim, said flange and rim functioning to give configuration and strength to said ferrous metal liner, said liner and said flange being joined together solely by an intermediate alloy layer of said light-metal with an alloy selected from the group consisting of molybdenum-iron and tin-iron to present a continuous unbroken metallic path to the flow of heat generated in the liner to the flange and main body portion of said wheel.

2. In an aluminum vehicle wheel for a pneumatic tire, a radially extending solid main-body portion, an off-set circumferential flange portion integrally formed with said main-body portion, radially and outwardly extending edges on the outer portion of said flange defining a pneumatic tire-supporting rim, a circular ferrous metal brake liner on the inner portion of said flange and having the outer lateral edge thereof substantially in the same radial plane as an edge of said flange, said liner and said flange being joined together solely by an intermediate alloy layer selected from the group consisting of molybdenum-iron-aluminum and tin-iron-aluminum to present a continuous unbroken metallic path to the flow of heat generated in said liner to said flange and main-body portion of said wheel.

3. A light-weight metal vehicle wheel as claimed in claim 2, in which the ferrous metal brake liner is composed of a plurality of segments, each of said segments having at least one radial fin extending into and bonded by said intermediate alloy to said aluminum flange.

4. In a vehicle wheel comprising a circular radially-extending aluminum body portion, a peripheral and axially extending aluminum flange portion integrally formed with said body portion, said flange portion having radially and outwardly extending edge portions defining a pneumatic tire supporting rim, a circular ferrous metal brake liner disposed in contact with the inner surface of said axially extending aluminum flange portion and joined thereto solely by a metallurgical bond consisting of a heat-conductive intermediate alloy layer selected from the group consisting of molybdenum-iron-aluminum and tin-iron-aluminum, said intermediate alloy layer having a thickness between 2 and 5 thousandths of an inch, thereby presenting a continuous unbroken metallic path to the flow of frictional heat from said liner to said flange and circular body portion, said circular body portion being of sufficient size to absorb and dissipate said heat sufficiently rapidly to prevent overheating of said intermediate alloy layer and incipient fusion on the free surface of said liner.

5. In a vehicle wheel comprising a circular aluminum body portion having an annular aluminum tire-supporting flange integral therewith, the improvement comprising a ferrous metal brake liner disposed radially inwardly of the inner surface of said flange and having a free surface adapted to contact a brake shoe, a heat-conductive intermediate alloy layer selected from the group consisting of molybdenum-iron aluminum and tin-iron-aluminum, said liner being metallurgically bonded to said inner surface of said flange solely by said intermediate alloy thereby presenting a continuous unbroken metallic path to the flow of frictional heat from said liner to said flange and circular body portion, said circular body portion being capable of absorbing and dissipating said heat sufficiently rapidly to prevent overheating of said intermediate alloy layer and incipient fusion on the free surface of said liner.

References Cited in the file of this patent

UNITED STATES PATENTS

| | | |
|---|---|---|
| 1,686,346 | Sanford | Oct. 2, 1928 |
| 1,727,486 | Sauzedde | Sept. 10, 1929 |
| 1,807,689 | Deputy | June 2, 1931 |
| 1,861,432 | Barber | June 7, 1932 |
| 1,957,654 | LaBrie | May 8, 1934 |
| 2,109,110 | Frank | Feb. 22, 1938 |
| 2,288,438 | Dach | June 30, 1942 |
| 2,435,991 | Whitfield | Feb. 17, 1948 |